(12) United States Patent
Eich

(10) Patent No.: US 6,892,200 B2
(45) Date of Patent: May 10, 2005

(54) JAVASCRIPT ENGINE

(75) Inventor: Brendan Eich, Los Gatos, CA (US)

(73) Assignee: America Online, Incorporated, Dulles, VA (US)

( * ) Notice: Subject to any disclaimer, the term of this patent is extended or adjusted under 35 U.S.C. 154(b) by 224 days.

(21) Appl. No.: 10/285,043

(22) Filed: Oct. 30, 2002

(65) Prior Publication Data

US 2003/0110160 A1 Jun. 12, 2003

Related U.S. Application Data

(60) Provisional application No. 60/332,641, filed on Nov. 13, 2001.

(51) Int. Cl.⁷ .............................................. G06F 17/30
(52) U.S. Cl. ......................................... 707/8; 707/102
(58) Field of Search ...................... 707/1, 8, 10, 103 R, 707/104.1, 203; 706/45; 708/250; 709/203, 204, 223, 229; 710/200; 712/23; 717/101, 104, 108, 115, 127, 139, 141; 718/100, 102, 107

(56) References Cited

U.S. PATENT DOCUMENTS

| | | | | |
|---|---|---|---|---|
| 5,761,670 A | * | 6/1998 | Joy ........................ 707/103 R |
| 5,862,376 A | * | 1/1999 | Steele et al. ................ 718/107 |
| 5,907,704 A | | 5/1999 | Gudmundson et al. ..... 717/100 |
| 5,909,559 A | | 6/1999 | So ............................. 710/307 |
| 5,991,790 A | | 11/1999 | Shah et al. .................. 718/100 |
| 6,088,044 A | | 7/2000 | Kwok et al. ................ 345/505 |
| 6,101,328 A | | 8/2000 | Bakshi et al. ............... 717/170 |
| 6,151,703 A | | 11/2000 | Crelier ........................ 717/136 |
| 6,178,432 B1 | | 1/2001 | Cook et al. .................. 715/513 |
| 6,178,439 B1 | | 1/2001 | Feit ............................. 709/200 |
| 6,179,489 B1 | | 1/2001 | So et al. ..................... 718/102 |
| 6,182,142 B1 | | 1/2001 | Win et al. ................... 709/229 |
| 6,185,625 B1 | | 2/2001 | Tso et al. .................... 709/247 |
| 6,199,195 B1 | | 3/2001 | Goodwin et al. ........... 717/104 |
| 6,230,312 B1 | | 5/2001 | Hunt ........................... 717/108 |
| 6,272,531 B1 | | 8/2001 | Shrader ....................... 709/206 |
| 6,275,935 B1 | | 8/2001 | Barlow et al. .............. 713/182 |
| 6,292,936 B1 | | 9/2001 | Wang .......................... 717/115 |
| 6,298,370 B1 | | 10/2001 | Tang et al. .................. 718/102 |
| 6,487,652 B1 | * | 11/2002 | Gomes et al. ................ 712/23 |
| 6,691,304 B1 | * | 2/2004 | Zhang et al. ............... 717/127 |

FOREIGN PATENT DOCUMENTS

| | | | | |
|---|---|---|---|---|
| EP | 1 113 361 | | 7/2001 | ............. G06F/9/16 |
| EP | 1 015 972 | | 10/2001 | ............. G06F/9/46 |

OTHER PUBLICATIONS

*The <Big Wig>*; Claus Braband, Anders Moller, and Michael I. Schwartzbach.
*The Curl Programming Environment*; F. Muffke; Dr. Dobb's Journal; Sep. 2001.
*Close–Up on .NET*; C. Young; Developer Network Journal; May–Jun. 2001.
*Development of a Web Database with Active Server Pages (ASP) and its Implementation in an Online Examination*; Liu Guan–Rong, and Chu Wu–Jun; Journal of Wuhan University of Technology; Jun. 2001.
*Simulator of Queueing Networks*; J. Sklenar; Proceedings of the 26th ASU Conference Object Oriented Modeling and Simulation; Sep. 26–28, 2000.

(Continued)

*Primary Examiner*—Apu Mofiz
(74) *Attorney, Agent, or Firm*—Glenn Patent Group; Michael A. Glenn

(57) ABSTRACT

A JavaScript enhancement is provided that increases performance of the JavaScript by avoiding the use of locking mechanisms in multi-threaded sessions. To do so, an object is deemed owned by a thread exclusively until the script is ended or suspended. Because scripts are typically short and complete quickly, the overhead to start and end a request containing a script is much less than the overhead of locking each and every object access done by the script, on average.

6 Claims, 4 Drawing Sheets

OTHER PUBLICATIONS

*Proceedings of the 26th ASU Conference Object Oriented Modeling and Simulation*; J. Sklenar; Proceedings of the 26th ASU Conference Object Oriented Modeling and Simulation; Sep. 26–28, 2000.
*Object Oriented Programming in JavaScript*; J. Sklenar; Proceedings of the 26th ASU Conference Object Oriented Modeling and Simulation; Sep. 26–28, 2000.
*The Object–JavaScript Language*; D.S. Hennen, S. Ramachandran, and S.A. Mamrak; Software—Practice and Experience; Nov. 25, 2000.
*Decrypting JavaScript*; K. Chambers; Application Development Advisor; Jul.–Aug. 2000.
*A Dynamic Select Component for JavaScript*; Dr. Dobb's Journal; Jan. 2000.
*JavaScript: not Java (but just as hot)*; B.W. Benson, Jr., SIGPLAN Notices; Apr. 1999.
*Generalized Event Handling in JavaScript;* A. Hildyard; WEB Techniques; Feb. 1999.
*A Design Pattern for Inter–Applet Communications*; J. Cozad; WEB Techniques; Oct. 1998.
*Writing JavaScript Applications*; B. Friesenhahn; BYTE; Feb. 1998.
*Building Distributed Web Applications with Visual JavaScript*; E. Vander Veer; WEB Techniques; Feb. 1998.
*JavaScript*; B.K. Duval, and L. Main; Library Software Review; Sep. 1997.
*ASEAM Developer's Manual*; Andreas Bauer; The Australian National University; Apr. 17, 2000.
*Modularity and Orthogonality in Object–Relational; DBMS Design*; Jens Thamm and Lutz Wegner.
*A Web Solution to Concurrency Awareness in Shared Data Spaces*; Jens Thmm, Stephen Wilke, and Lutz Wegner.

* cited by examiner

JAVASCRIPT ENGINE

CROSS-REFERENCE TO RELATED APPLICATIONS

This application claims priority to U.S. Provisional patent application No. 60/332,641 filed Nov. 13, 2001.

BACKGROUND OF THE INVENTION

1. Technical Field

The invention relates to locking mechanisms. More particularly, the invention relates to a JavaScript enhancement that increases the performance of the JavaScript by avoiding the use of locking mechanisms in multi-threaded sessions.

2. Description of the Prior Art

Multi-threaded technology is well known and well used in the computer programming and application development industry. In particular, multi-threaded programming is permitted and supported by the World Wide Web (Web) and particularly within the JavaScript language. Web browsers and Web servers communicate with each other using multi-threaded technology to deliver information, whether in graphical format or in other media, to end users. In a multi-threaded situation, where more than one task is performed simultaneously, it is possible for more than one thread to try to access a same encapsulated programming object, thus creating problems if that object's state is being changed by one of the sharing threads.

Locking mechanisms are known in the art to lock an object by a thread requesting access to that object, thereby preventing it from being accessed by another thread until the first thread is done with the object. However, locking mechanisms can be expensive because they add overhead before and after the critical code sections that acquire and release the lock, and because in the case of contention for a lock among multiple threads, they incur further overhead.

S. Barlow, E. Leaphart, Jr., G. V. Strazds, and C. Rudbart (herein referred to as Barlow et al), Systems and Methods for Locking Interactive Objects, U.S. Pat. No. 6,275,935 (Aug. 14, 2001) disclose an object locking system for preventing unauthorized modification of interactive objects having one or more object states. An object designer interactively assigns one or more object behaviors to each object state. An end user of the object displays the object behavior associated with an object state, typically by invoking the object state with an input device. A lock behavior provides a way of locking an object behavior or aspect of an object. The object designer sets which aspects of an object are to be locked, and a lock controller prevents active access to those aspects accordingly. In addition, an object can be locked based on a password or based on the location of display of the object. Barlow et al do not teach locking an object under an atypical situation where an object is not owned exclusively by the current thread in a JavaScript engine. A. I. Wang, Enabling Multiple Runtime Processors in an Interpreter-Based Embedded Scripting System, U.S. Pat. No. 6,292,936 discloses an interpreter-based embedded scripting environment that includes multiple runtime processors executed by a computer. Each of the runtime processors processes their respective corresponding intermediate sources derived from an original input source in a synchronous manner. One or more of the respective corresponding intermediate sources includes a synchronizer token that provides synchronization among the runtime processors. Using the synchronizer token, an execution sequence of the original input source is maintained. Nowhere does Wang teach or even suggest locking an object under an atypical situation where an object is not owned exclusively by the current thread in a JavaScript engine.

C. Braband, A. Moller, and M. I. Schwartzbach, The <Big Wig> Project,BRICS, Department of Computer Science, University of Aarhus, Denmark {brabrand,amoeller,mis}@brics.dk disclose the results of a project that aimed to design and implement a high-level domain-specific language for programming interactive Web services. They disclose that a mechanism is needed to discipline the concurrent behavior of the active threads. They continue to say that a simple case is to control access to the shared variables, using mutex regions or the readers/writers protocol. Another issue, they put forth, is enforcement of priorities between different session kinds, such that a management session may block other sessions from starting; a final example being event handling, where a session thread may wait for certain events to be caused by other threads. Braband et al disclose that they deal with all of these scenarios in a uniform manner based on a central controller process in a runtime system. However, nowhere do Braband et al teach or even suggest providing a simple and elegant enhancement that avoids use of locking mechanisms that otherwise create a lot of overhead.

It would be advantageous to increase performance of a JavaScript engine by avoiding the unnecessary use of locking mechanisms in multi-threaded sessions.

SUMMARY OF THE INVENTION

A JavaScript enhancement is provided that increases performance of the JavaScript by avoiding the use of locking mechanisms in multi-threaded sessions. To do so, an object is deemed owned by a thread exclusively until the script is ended or suspended. Because scripts are typically short and complete quickly, the overhead to start and end a request containing a script is much less than the overhead of locking each and every object access done by the script, on average.

DETAILED DESCRIPTION OF THE INVENTION

A JavaScript enhancement is provided that increases performance of the JavaScript by avoiding the use of locking mechanisms in multi-threaded sessions. To do so, an object is deemed owned by a thread exclusively until the script is ended or suspended. Because scripts are typically short and complete quickly, the overhead to start and end a request containing a script is much less than the overhead of locking each and every object access done by the script, on average. In fact, both overheads added together are still less than the sum of all object lock/unlock overhead for a script that accesses object properties many times, as most scripts, even short ones, do.

For a better understanding of the invention, an overview of part of Web browser/server basic communication is described with reference to Table A and FIGS. 1–3 below. A Web browser requests a Web page, such as, for example, page.html, and such page may contain JavaScript source such as depicted in Table A, wherein Table A is an example of JavaScript source code.

TABLE A

<script>
alert ("hi");
</script>

Figure 1:
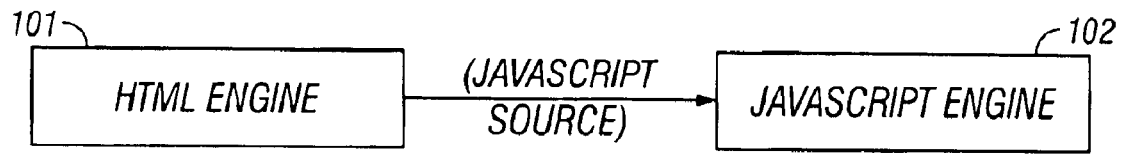
FIG. 1 shows an HTML engine transmitting JavaScript source code, such as from an HTML page, to a JavaScript engine according to the prior art.

FIG. 1 shows that an HTML engine 101 transmits JavaScript source code, such as in Table A from an HTML page to a JavaScript engine 102 according to the prior art.

Additionally, the JavaScript engine at times interprets data assignments to JavaScript objects. For example, in Table B herein below, a variable, or object, "o" is assigned a value of "42" to its property "p", as in the first line of Table B. The second line of Table B shows that the p property of o, i.e. o.p, is assigned to a different value, namely 43. Finally, Table B shows in line three that a second property "q" is defined for o, i.e. o.q, and is assigned the value 44.

Figure 2:
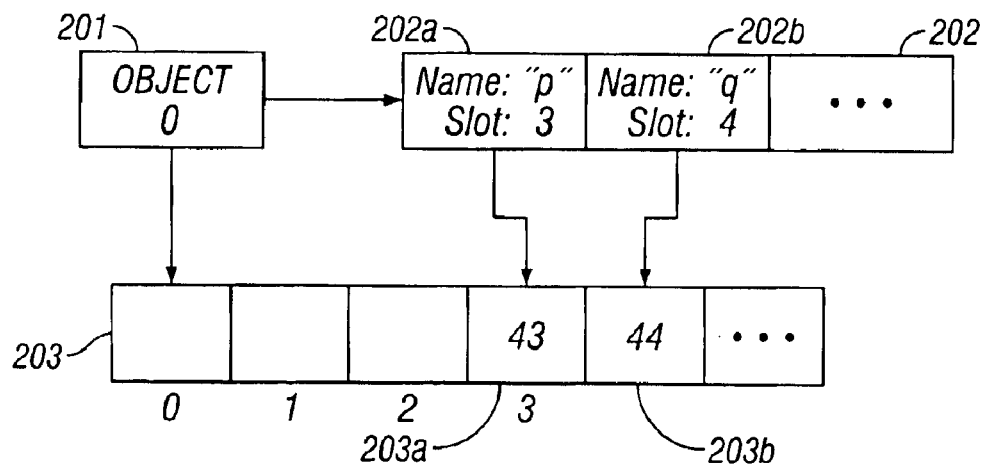
FIG. 2 shows the data structure of an object, o, having a scope component and a slots component according to the prior art.
Figure 3:
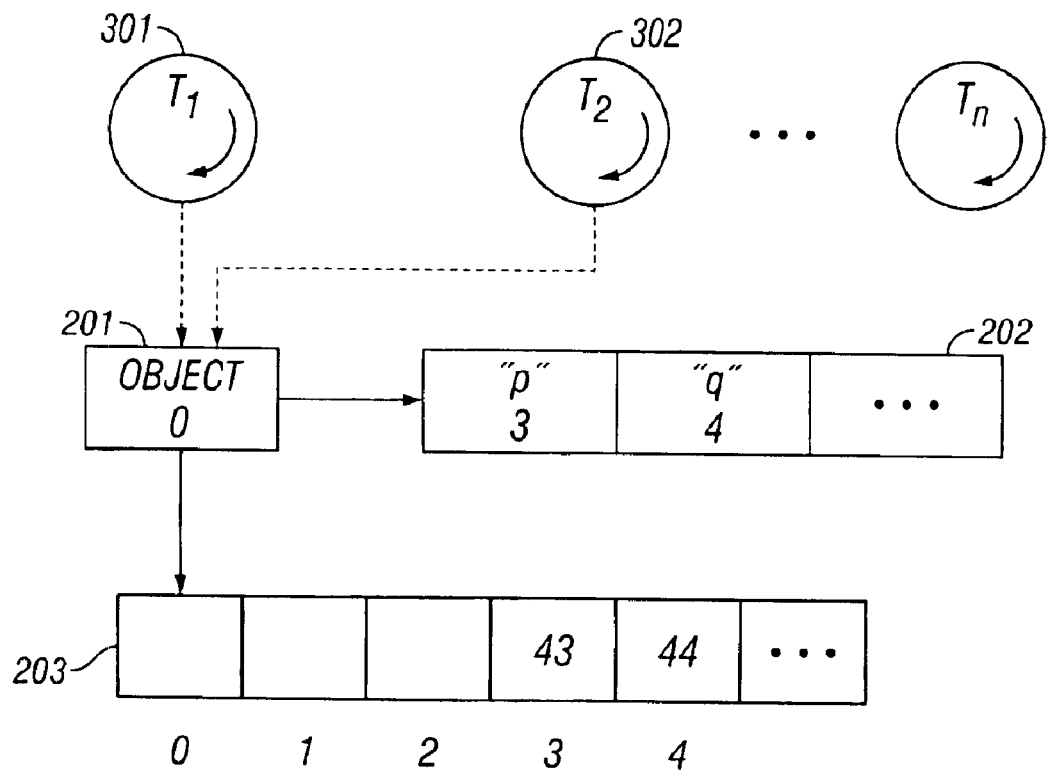
FIG. 3 depicts an object, o, of interest to two different threads, $T_1$ and $T_2$, according to the prior art.

TABLE B var o={p:42};
o.p=43;
0.q=44;

FIG. 2 shows the data structure of the object, o 201 having a scope component 202 and a slots component 203. The scope component 202 has entries for each of o's properties. For example, the first scope entry 202a has "p" assigned to a name attribute, and 3 assigned to a slot attribute. The second scope entry has "q" assigned to the name attribute and 4 assigned to the slot attribute. Similarly, in the slots component 203, the fourth entry 203a, slot 3, had an assigned value of 42 updated to a new assigned value of 43. The fifth entry 203b, slot 4, is assigned the value of 44.

Thus, by reference to FIG. 2, it is easy to see that if two threads request modifying the same object, confusion or error result. FIG. 3 depicts the same object of interest to two different threads, $T_1$ 301 and $T_2$ 302. It is clear to discern from FIG. 3 that whether slot 3 203a has the value of 42 or 43 depends on the timing of accessing slot 3 203a.

To avoid the potential confusion rendered by two or more threads accessing an object simultaneously, interlocking mechanisms have been created and implemented. For example, in JavaScript, per-scope locks are available and used for the following situations:

when adding a property;

when deleting a property;

when looking up a property; and when getting a property value.

It should be appreciated that such objects discussed above are rarely shared among threads. That is, it is rare that two or more threads will request action on the same object simultaneously or in any temporal overlapping fashion.

Figure 4:
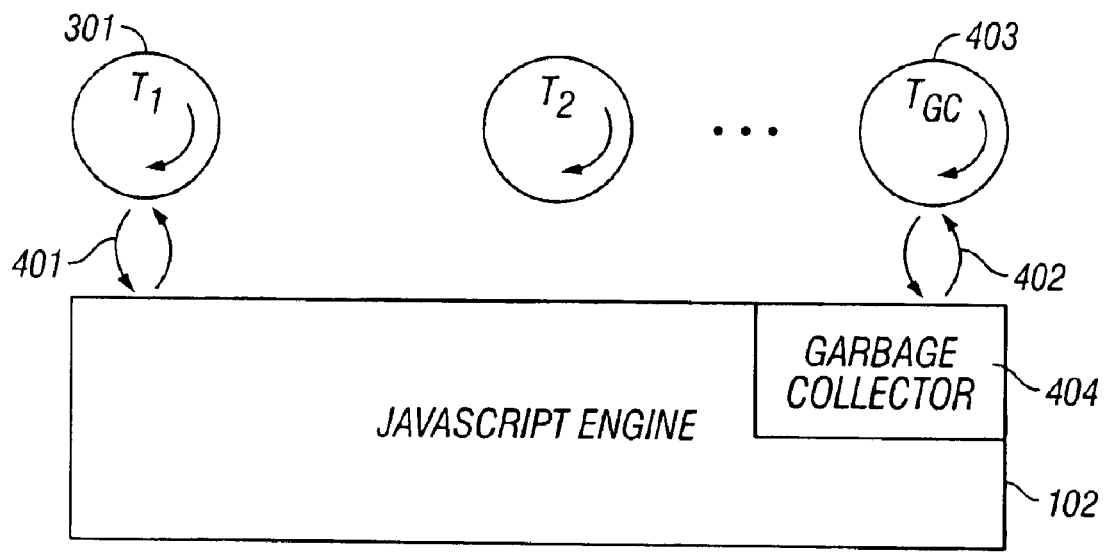
FIG. 4 is a schematic diagram showing the control flow of a plurality of threads with the JavaScript engine, and the control flow of a garbage collector thread with the garbage collector component of the JavaScript engine according to the prior art.

It should also be appreciated that the JavaScript engine has a garbage collector mechanism that together with particular JavaScript engine application program interface (API) commands, based on a JavaScript request model, perform a type of object locking control. The JavaScript request model is described with reference to FIG. 4, a schematic diagram showing typical control flow 401 of a thread $T_1$ 301 with the JavaScript engine 102, and the control flow 402 of a garbage collector thread 403 with the garbage collector component 404 of the JavaScript engine 102. Specifically, the JavaScript engine 102 responds to requests from threads by recognizing and interpreting begin request and end request commands as illustrated in Table C below.

TABLE C

JS_BeginRequest
. . .
    JS_EvaluateScript(. . ."alert('hi')");
. . .
JS_EndRequest When the garbage collector component 404 begins to collect garbage, it checks whether or not any begin request commands are outstanding. If so, the garbage collector component 404 waits until such outstanding begin request commands are terminated by their respective end request command.

Figure 5:
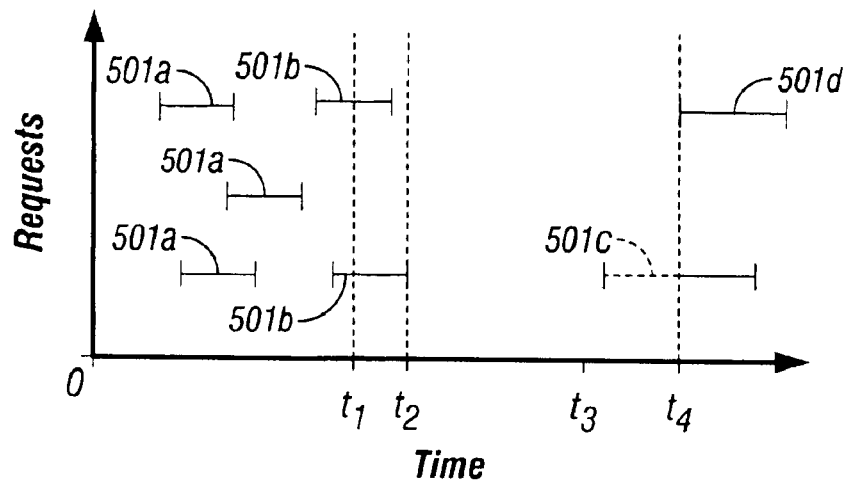
FIG. 5 is a graph showing that a garbage collector waits to start collecting garbage until all outstanding requests have been completed according to the prior art.

The request model is described with reference to FIG. 5, a graph showing a garbage collector waiting to start collecting garbage until after all outstanding requests are completed. Also, any begin request made while the garbage collection in progress is suspended until garbage collection has completed. The such request can resume. A plurality of relatively short requests are plotted against time. Those requests ending before the garbage collector begins 501a at time $t_1$ do not impact when the garbage collector starts at time $t_2$. Those requests in progress 501b when the garbage collector tries to begin at time $t_1$ affect when the garbage collector actually beings. The garbage collector waits until the last request is finished which is at time $t_2$. At time $t_3$ another request is made 501c, but is not allowed to proceed until the garbage collector is finished which is time $t_4$. At time $t_4$ such request is allowed to proceed. Any other request 501d made after time $t_4$ is allowed to proceed normally. Thus, the garbage collector 406 respects the begin request commands by waiting until they are finished.

Similarly, an object can be explicitly locked until it is no longer used. In the JavaScript language, for example, the JS_LOCK_OBJ command taking two arguments, one of them being the context, i.e. the thread, and the other being the object, can be used to lock the object. An example of using JS_LOCK_OBJ is shown in Table D of pseudocode for adding element o.q (202b and 203b) to object o of FIG. 2 by first locking object o.

TABLE D

```
JS_LOCK_OBJ(context,object)
   lookup "q"
   if "q" not found
      add "q"
   store 44 in slot 3
JS_UNLOCK_OBJ(context,object)
```

It should be appreciated that the procedure for locking object o to avoid simultaneously accessing an object described herein above and illustrated in Table D is expensive, because it, for one reason, causes the runtime to take too long from the perspective of an end user.

The preferred embodiment of the invention provides a way of avoiding using a locking mechanism when it is not needed. According to the preferred embodiment of the invention, the JavaScript engine is instructed first to check if the owner of the object's scope, i.e. context, is the same entity as that used by the current thread. If they are the same, then there is no need to request locking the object. If they are not the same, then the JavaScript engine is instructed to promote a lock on the object's scope. Table E below provides an example of such pseudocode.

TABLE E

```
if (object's scope is owned by 'context')
      do nothing;
else  {
      promote object's scope lock;
      (that is, something expensive at the OS-level locking)
      }
```

In the preferred embodiment of the invention, the owner of an object is set in, but is not limited to, the following three situations:
  when the scope is initially created, then set the scope's ownership to the current thread's context;
  when a second thread claims exclusive ownership of a scope, after the first thread is done with it, set the ownership to the second thread's context; and
  when ownership is shared, i.e. when a second thread requests using the object and the first thread is not presently finished with the object, then set the object's ownership to null.

It should be appreciated that in the last situation, setting the ownership to null for shared ownership is an expensive process.

Figure 6:
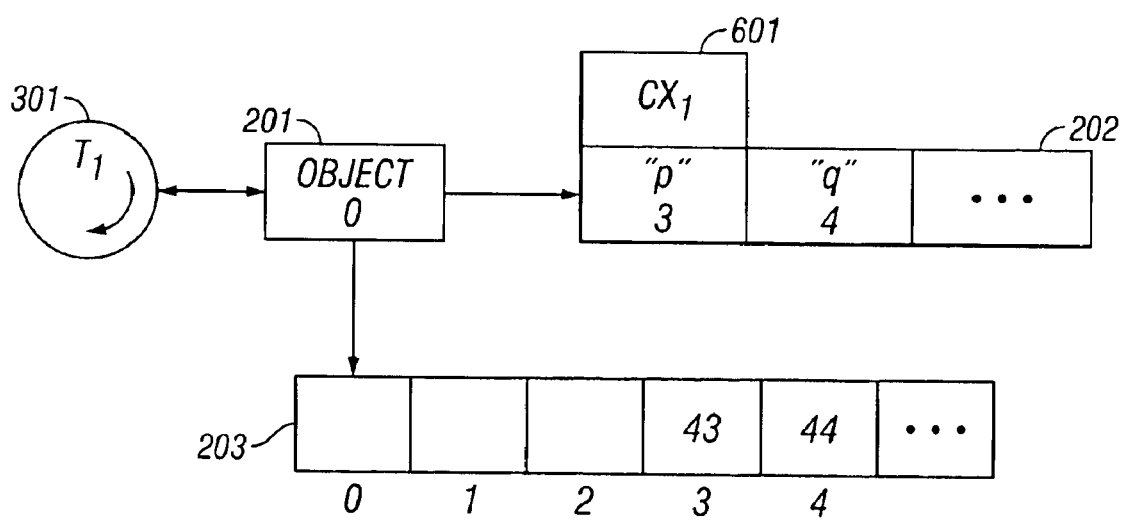
FIG. 6 is a schematic diagram of object o of FIG. 2 also showing an additional attribute of object o, the owner, $cx_1$, that corresponds to thread $T_1$ having a context of $cx_1$ according to the prior art.

For further understanding of the preferred embodiment of the invention, an additional attribute of object o, the owner of the object, $cx_1$ 601 that corresponds to thread $T_1$ having a context of $cx_1$ 601, is shown in FIG. 6.

Figure 7:
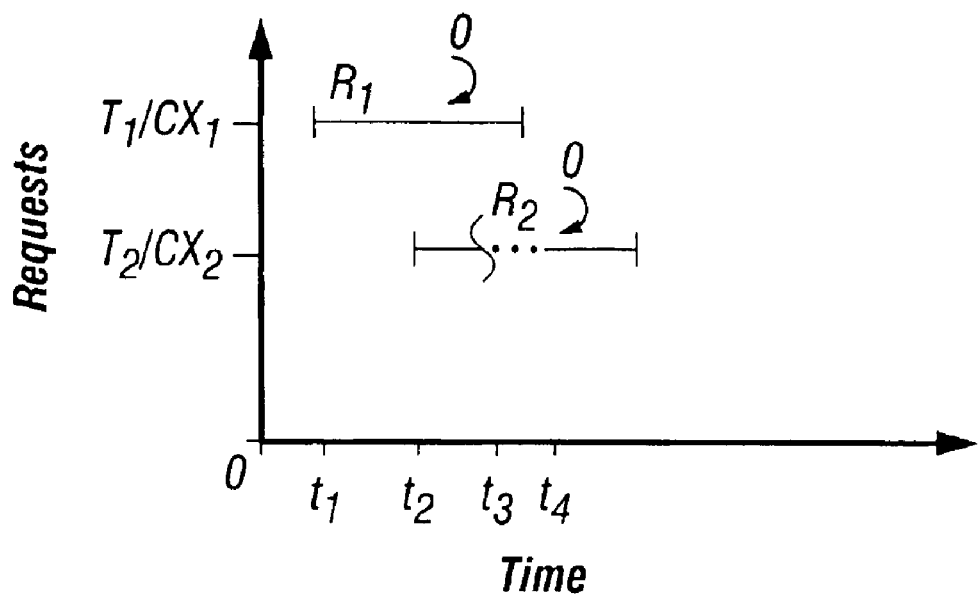
FIG. 7 is a graph showing threads $T_1$ and $T_2$ having contexts of $cx_1$ and $cx_2$, respectively, each making requests $R_1$ and $R_2$, respectively, to the JavaScript engine to use object o simultaneously according to the invention.

An implementation of the locking mechanism according to the preferred embodiment of the invention is described with reference to FIG. 7. FIG. 7 is a graph showing a thread $T_1$ having a context of $cx_1$ and making a request $R_1$ to the JavaScript engine at time $t_1$ that uses object o. A little further in time, a second thread $T_2$ having a context $cx_2$ begins a request $R_2$ to the JavaScript engine at a time $t_2$. At time $t_3$, $R_2$ requests to use object o. The JavaScript engine compares the context of thread $T_2$, $cx_2$, with the ownership of object o, $cx_1$, and discovers that they are different. The JavaScript engine suspends $R_2$ at time $t_3$ until $R_1$ has completed using object o, which is at time $t_4$. At time $t_4$, the JavaScript engine sets the ownership of object o to 'null' and resumes $R_2$.

Figure 8:
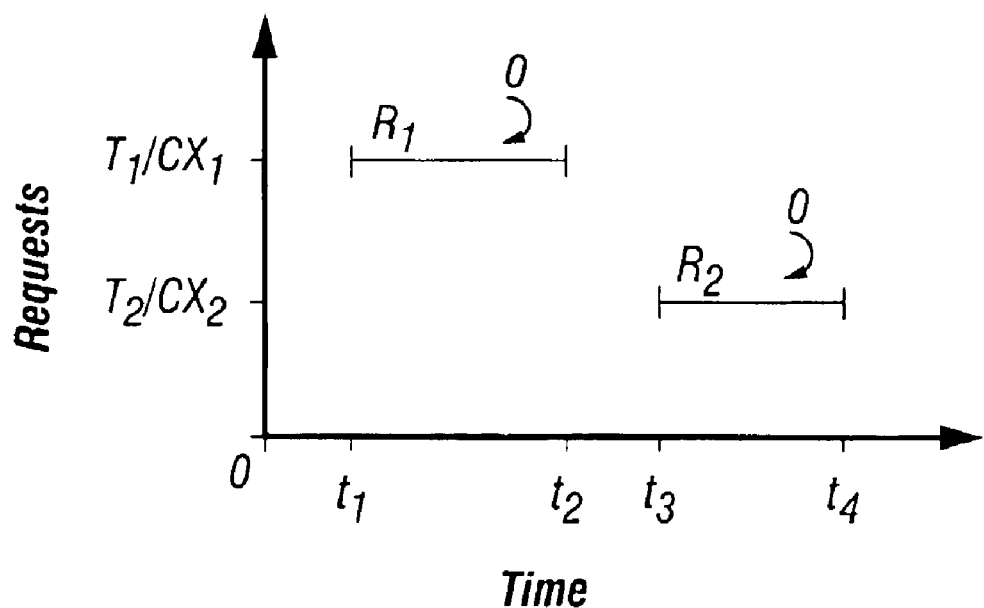
FIG. 8 is a graph showing threads $T_1$ and $T_2$ having contexts of $cx_1$ and $cx_2$, respectively, each making successful requests $R_1$ and $R_2$, respectively, to the JavaScript engine to use object o according to the invention.

An example of successful claims on object o defined as when no locking mechanism is used, according to the invention is described with reference to FIG. 8. FIG. 8 is a graph showing a thread $T_1$ having a context of $cx_1$ making a request $R_1$ to the JavaScript engine at time $t_1$ that uses object o. Thread $T_1$ is done with request $R_1$ at time $t_2$. A little further in time, a second thread $T_2$ having a context $cx_2$ begins a request $R_2$ to the JavaScript engine at a time $t_3$ which is after time $t_2$. $R_2$ requests to use object o. The JavaScript engine sets the ownership of object o to $cx_2$, because $T_2$ is allowed to claim exclusive ownership to object o. $R_2$ completes at time $t_4$ with no suspensions on account of object o being used simultaneously by another thread.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A computer implemented method for avoiding using a locking mechanism when a thread having a context requests to use an object having a scope and having an owner of said scope, said method comprising:
  determining if said owner is the same as said context;
  if said owner is the same as said context, then avoiding using locking mechanism;
  if said owner is not the same as said context, then promoting a lock on said object's scope;
  initially setting said object's scope's owner to a current context of a current thread when said object's scope is created;
  resetting said object's scope's owner to a second thread's context when said second thread claims exclusive ownership of said scope; and
  setting said object's scope's owner to null when said ownership is shaped.

2. A computer implemented method for locking an object having an ownership attribute, wherein a first thread having a first context makes a first request to a JavaScript engine at a first time, said first request comprising using said object, and a second thread having a second context makes a second request to the JavaScript engine at a second and later time, said second request comprising using said object, said method comprising:
  said JavaScript engine determining if said first request is finished with said object;
  if said first request is not finished with said object, then:
    said JavaScript engine comparing said second context of said second thread with said ownership attribute of said object;
    if said comparison is different, then suspending said second request until said first request is finished with said object;
    said JavaScript engine setting said ownership attribute of said object to null;
    said JavaScript engine resuming said second request;
  otherwise, said JavaScript engine setting said ownership attribute of said object to said second context and processing said second request.

3. An computer implemented apparatus for avoiding using a locking mechanism when a thread having a context requests to use an object having a scope and having an owner of said scope, said apparatus comprising:
  means for determining if said owner is the same as said context;
  if said owner is the same as said context, then means for avoiding using locking mechanism;

if said owner is not the same as said context, then means for promoting a lock on said object's scope;

means for initially setting said object's scope's owner to a current context of a current thread when said object's scope is created;

means for resetting said object's scope's owner to a second thread's context when said second thread claims exclusive ownership of said scope; and means for setting said object's scope's owner to null when said ownership is shared.

4. An computer implemented apparatus for locking an object having an ownership attribute, wherein a first thread having a first context makes a first request to a JavaScript engine at a first time, said first request comprising using said object, and a second thread having a second context makes a second request to the JavaScript engine at a second and later time, said second request comprising using said object, said apparatus comprising:

means for said JavaScript engine determining if said first request is finished with said object;

if said first request is not finished with said object, then:

means for said JavaScript engine comparing said second context of said second thread with said ownership attribute of said object;

if said comparison is different, then means for suspending said second request until said first request is finished with said object;

means for said JavaScript engine setting said ownership attribute of said object to null;

means for said JavaScript engine resuming said second request;

otherwise, means for said JavaScript engine setting said ownership attribute of said object to said second context and processing said second request.

5. A computer implemented method for locking an object having an ownership attribute, wherein a first thread having a first context makes a first request to a scripting service thread (all cases) engine at a first time, said first request comprising using said object, and a second thread having a second context makes a second request to the scripting engine at a second and later time, said second request comprising using said object, said method comprising:

said scripting engine determining if said first request is finished with said object;

if said first request is not finished with said object, then:
said scripting engine comparing said second context of said second thread with said ownership attribute of said object;

if said comparison is different, then suspending said second request until said first request is finished with said object;

said scripting engine setting said ownership attribute of said object to null;

said scripting engine resuming said second request;

otherwise, said scripting engine setting said ownership attribute of said object to said second context and processing said second request.

6. A computer implemented apparatus for locking an object having an ownership attribute, wherein a first thread having a first context makes a first request to a scripting engine at a first time, said first request comprising using said object, and a second thread having a second context makes a second request to the scripting engine at a second and later time, said second request comprising using said object, said apparatus comprising:

means for said scripting engine determining if said first request is finished with said object;

if said first request is not finished with said object, then:
means for said scripting t engine comparing said second context of said second thread with said ownership attribute of said object;

if said comparison is different, then means for suspending said second request until said first request is finished with said object;

means for said scripting engine setting said ownership attribute of said object to null;

means for said scripting engine resuming said second request; and otherwise, means for said scripting engine setting said ownership attribute of said object to said second context and processing said second request.

* * * * *